(No Model.)

B. A. MATHEWSON.
HAND CORN SHELLER.

No. 417,063. Patented Dec. 10, 1889.

WITNESSES:
Chas. H. Luther Jr
M. F. Bligh

INVENTOR:
Bradford A. Mathewson
by Joseph A. Miller & Co.
Attys

UNITED STATES PATENT OFFICE.

BRADFORD A. MATHEWSON, OF PROVIDENCE, RHODE ISLAND.

HAND CORN-SHELLER.

SPECIFICATION forming part of Letters Patent No. 417,063, dated December 10, 1889.

Application filed August 5, 1889. Serial No. 319,785. (No model.)

*To all whom it may concern:*

Be it known that I, BRADFORD A. MATHEWSON, of the city and county of Providence, and State of Rhode Island, have invented a new and useful Improvement in Hand Corn-Shellers, of which the following is a full, clear, and exact description, reference being had to the accompanying drawings, forming part of this specification.

Figure 1:
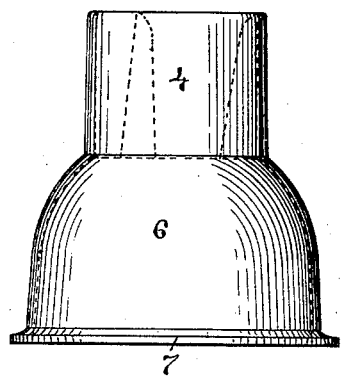
Figure 2:
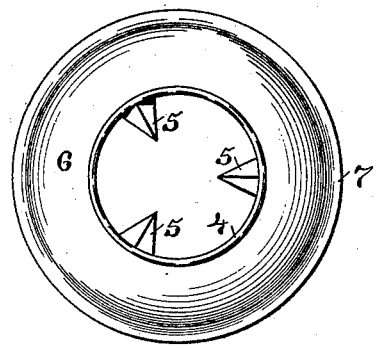
Figure 3:
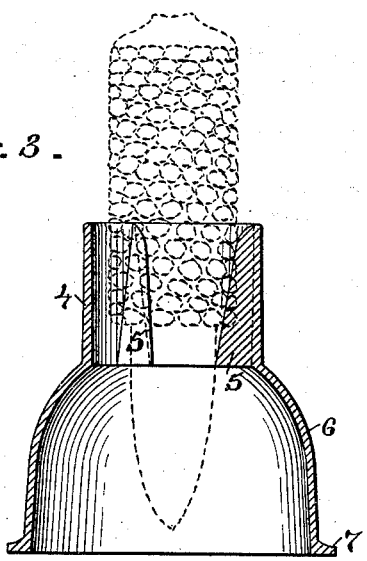

Figure 1 is a view of my improved hand corn-sheller. Fig. 2 is a plan view of the same. Fig. 3 is a sectional view showing an ear of corn in the act of shelling, in broken lines.

The object of my invention is to produce a hand corn-sheller that can be readily grasped by one hand and securely held while the ear of corn is turned to remove the corn.

The invention consists in the peculiar and novel construction of the device, as will be more fully set forth hereinafter.

In the drawings, number 4 indicates a short cylinder of a diameter greater than the ordinary ear of corn.

5 5 are ribs projecting from the interior of the cylinder 4, increasing in width toward the bottom, where they approach each other, to points between which the empty cob will pass.

The dome-shaped base 6 extends from the lower end of the cylinder 4 and ends in the projecting flange 7. The dome-shaped base is made of a size to fit the hand, so that in holding, the cylinder 4 will rest between the thumb and forefinger, while the dome of the base fits the hollow of the hand and the little finger or the ring-finger bears firmly against the flange 7, so that the corn-sheller is held firmly without strain. In use it may be firmly held onto the bottom of or over a pan or pail by one hand while the other turns the ear of corn and quickly removes the kernels. The dome-shaped base acts to guide the shelled corn into the vessel over which the corn-sheller is held. When a portion of the corn is removed from the cob, the hand can be readily inserted into the dome-shaped base to grasp the cob and turn the same from below to remove the remaining kernels.

By supporting the hand corn-sheller on the dome-shaped base greater pressure can be exerted on the ear of corn and a great deal more corn can be shelled in a given time than is possible in a hand corn-sheller not so supported.

Having thus described my invention, I claim as new and desire to secure by Letters Patent—

1. A hand corn-sheller consisting of the cylinder 4 and ribs 5, wider at the bottom than at the top, and the enlarged dome-shaped base 6, as described.

2. A hand corn-sheller having the cylinder 4, the tapering inward-projecting ribs 5, the dome-shaped base 6 of a size to permit a hand to grasp and turn the cob, and the projecting flange 7, as described.

BRADFORD A. MATHEWSON.

Witnesses:
   J. A. MILLER, Jr.,
   M. F. BLIGH.